United States Patent [19]
Peterson et al.

[11] Patent Number: 5,349,999
[45] Date of Patent: Sep. 27, 1994

[54] MOBILE COMBINATION DEBARKING/CHIPPING MACHINE

[75] Inventors: Arnold N. Peterson, Eugene; Larry A. Sprague, Pleasant Hill, both of Oreg.

[73] Assignee: Peterson Pacific Corp., Eugene, Oreg.

[21] Appl. No.: 65,708

[22] Filed: May 24, 1993

[51] Int. Cl.⁵ .................. B27L 7/00; B27L 1/00
[52] U.S. Cl. .................. 144/208 J; 144/2 Z; 144/3 R; 144/341; 144/370; 241/101.7
[58] Field of Search .......... 241/101.7; 144/2 Z, 144/3 R, 3 D, 162 R, 176, 208 R, 208 J, 341, 370

[56] References Cited

U.S. PATENT DOCUMENTS

| | | | |
|---|---|---|---|
| Re. 33,840 | 3/1992 | Peterson | 144/208 J |
| 1,597,332 | 8/1926 | Waddell et al. | 144/208 J |
| 1,670,723 | 5/1928 | Hummel | 144/208 J |
| 2,599,962 | 6/1952 | Williford | 144/208 J |
| 4,690,187 | 9/1987 | Schmidt | 144/208 J |
| 4,719,950 | 1/1988 | Peterson | 144/208 J |
| 4,721,139 | 1/1988 | Peterson | 144/208 J |
| 4,729,415 | 3/1988 | Peterson | 144/208 J |
| 4,889,169 | 12/1989 | Peterson | 144/208 J |
| 4,903,744 | 2/1990 | Peterson | 144/208 J |
| 4,989,655 | 2/1991 | Peterson | 144/208 J |
| 5,148,844 | 9/1992 | Robison | 144/208 J |

FOREIGN PATENT DOCUMENTS

| | | | |
|---|---|---|---|
| 55963 | 12/1935 | Norway | 144/208 J |
| 7345 | 12/1896 | Sweden | 144/208 J |

*Primary Examiner*—W. Donald Bray
*Attorney, Agent, or Firm*—Robert L. Harrington

[57] ABSTRACT

A combination debarking/delimbing and chipping machine for processing logs is mounted on a single chassis. The debarking/delimbing apparatus of the machine has a lower flail positioned below a material feed path and two adjustable flails positioned above the material feed path. The upper flails will adjust to the size of a log fed into the machine. The provisions of two upper flails assures total removal of bark/limbs from the log and aids in discharging loosened bark. The upper flails may be driven at variable rates and may be reversibly driven. The provisions of two upper flails enables a reduced rotational speed of the flails which enhances flail life.

8 Claims, 3 Drawing Sheets

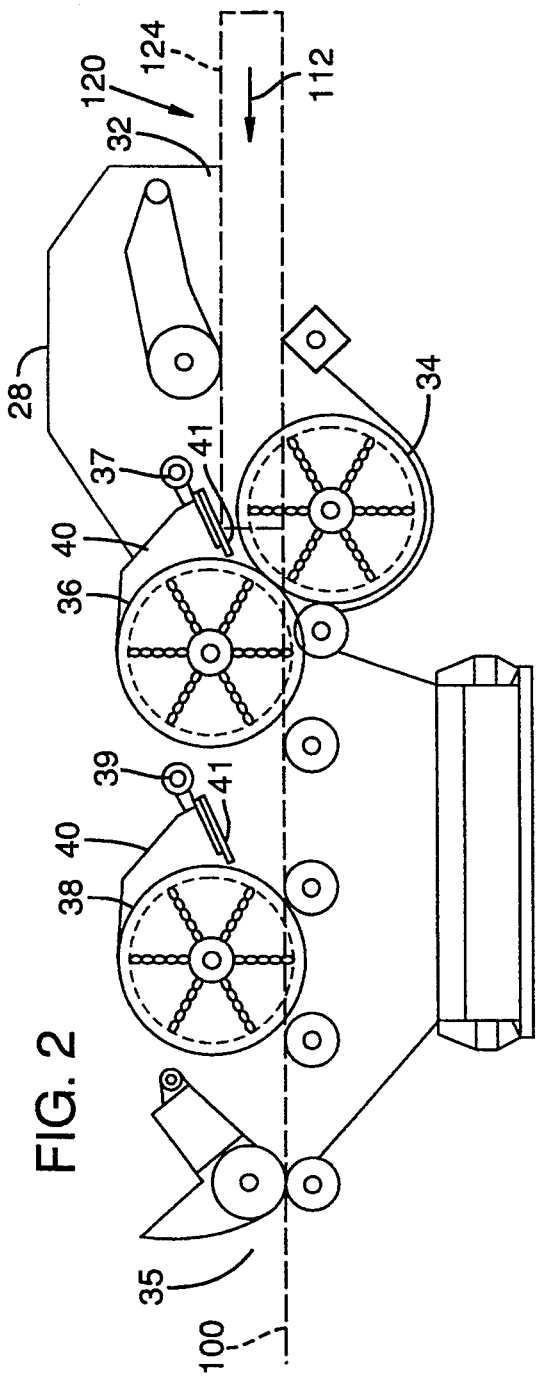
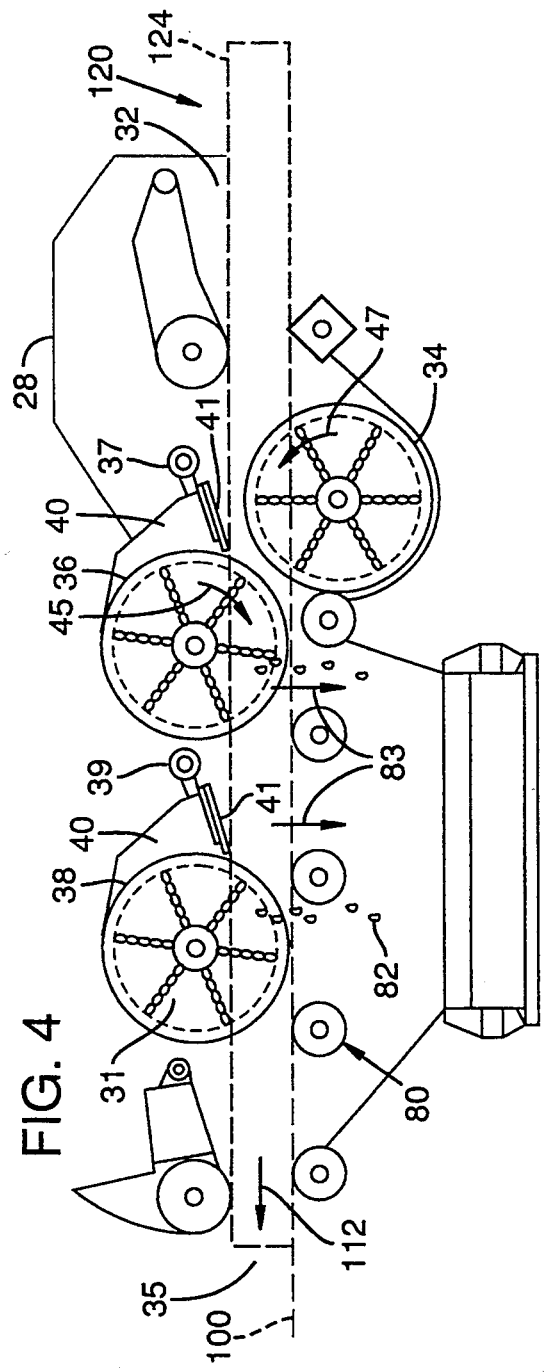

MOBILE COMBINATION DEBARKING/CHIPPING MACHINE

FIELD OF THE INVENTION

This invention relates to processing logs into wood chips and more particularly relates to a combination debarking/delimbing and chipping apparatus having improved bark/limb removing capabilities.

BACKGROUND INFORMATION

It is now common to process logs into wood chips at logging sites rather than transport the unprocessed logs to a processing mill for chipping. It is easier and more cost effective to haul chips from the logging site rather than haul unprocessed logs.

The processing of logs into chips at the logging site requires apparatus to first debark/delimb the logs and then reduce the debarked/delimbed logs into chips. The standards for the chips produced is changing. The allowed percentage of contaminants in the chips such as bark and other debris is decreasing. This means that the debarking/delimbing operation must provide a "cleaner" log before it is chipped. Not only must the log be clean, but loose bark and other debris must be prevented from entering the chipping machine. Along with the higher standards for chips, many mills of today require a chip that is larger in size.

A combination machine was developed that had a debarking/delimbing machine, chipping machine and loader mounted on a single chassis. A machine of this type is disclosed in U.S. Pat. No. 33,840, Peterson et al (Reissue of U.S. Pat. No. 4,889,169). The combination machine has the capability to process multiple logs at once and most often bundles of logs are fed into the machine. The chipping machine is mounted at a distance from the debarking/delimbing machine and a conveyor is provided to convey the log bundle exiting the debarking/delimbing machine into the chipping machine and to provide an exit for the loosened bark. The machine has a longitudinal feed path that extends substantially along the length of its chassis. The debarking/delimbing machine has a lower flail in a fixed position and an upper floating flail that will adjust to the largest diameter log of a log bundle.

One of the problems with the processing of logs in bundles is that the logs diameters vary from log to log. The upper flail of the debarking/delimbing machine adjusts to the largest diameter log in the bundle. On occasion a log in the bundle will not be adequately contacted by the upper flail and more than an acceptable amount of the bark will not be loosened or removed. The lower flail has gravity working on its side and regardless of the log diameter the bottom side of the log will be impacted by the lower flail to loosen and remove the bark, limbs and other debris from the log. Once the log passes the flails there is no mechanism to loosen the bark. The bark retained on a log will be chipped with the log as it enters the chipping machine and thus will contaminate the chips. Also, even with the chipping machine spaced at a distance from the debarking/delimbing machine, loosened bark may be transported on top of the bundle into the chipping machine. Contamination of the wood chips whether it be from intact or loosened bark is to be avoided to the extent possible.

As was previously mentioned, mills often require chips that are larger in dimension than chips previously used. One of the ways of increasing the size of the wood chips is to increase the rate at which the logs are fed into the chipping machine. This requires that the logs be fed through the debarking/delimbing machine at a higher feed rate. This compounds the bark removal process. In order to accommodate the higher feed rates, the rotational speed of the flails must be increased. This has a detrimental effect in that the life of the flails (chains) is dramatically decreased. One of the highest maintenance costs of the debarking/delimbing machine is the cost of replacing the chains due to wear or breakage. It is also believed that the increased speed required of the flails will often damage the fibers of the log exposed to the impacting of the flail. The damaged fibers result in a chip of poorer quality.

BRIEF SUMMARY OF THE INVENTION

The present invent ion is an improved combination debarking/delimbing and chipping machine. The machine is arranged to greatly increase the capability of removing bark and other debris from logs before the logs enter the chipping machine.

A preferred embodiment of the combination machine of the present invention has a debarking/delimbing machine, a chipping machine and a loader mounted on a single chassis. A conveyor is provided for conveying logs exiting the debarking/delimbing machine into the chipping machine. The conveyor has spaced openings to facilitate discharging loosened bark and other debris into a discharge chute mounted strategic to the conveyor. The combination machine is arranged to process multiple logs at a time. Multiple logs are thus fed into the debarking/delimbing machine at one time, the multiple logs being referred to as a bundle. The debarking/delimbing machine is arranged with a lower fixed flail and two upper adjustable (floating) flails. The upper flails are arranged to automatically adjust to the largest diameter log of a log bundle fed into the debarking/delimbing machine. In addition to the adjustable height feature of the upper flails, the rotational speed and direction of rotation of the flails are independently controllable.

Providing two upper flails on the debarking/delimbing machine greatly reduces the probability of a log passing through the debarking/delimbing machine with any portion of its bark intact. The second flail also aids in discharging the loosened bark through openings in the conveyor and into the discharge chute. In addition to enhancing the removal of bark and other debris, it has been found that the rotational speed of the flails may be decreased thus prolonging the life of the chains of the flails. Furthermore, whereas the initial upper and lower flails are rotated to throw the bark toward the chipper, it is advantageous to reverse the rotation of the third flail to direct the loosened bark away from the chipper.

Other objects and advantages will be apparent from the detailed description and the drawings.

BRIEF DESCRIPTION OF THE DRAWINGS

FIG. 2 is a schematic illustration of the debarking/delimbing unit of the combination machine of FIG. 1;

FIG. 4 is another schematic illustration of the debarking/delimbing unit of the combination machine of FIG. 1.

DESCRIPTION OF THE PREFERRED EMBODIMENT

Figure 1:
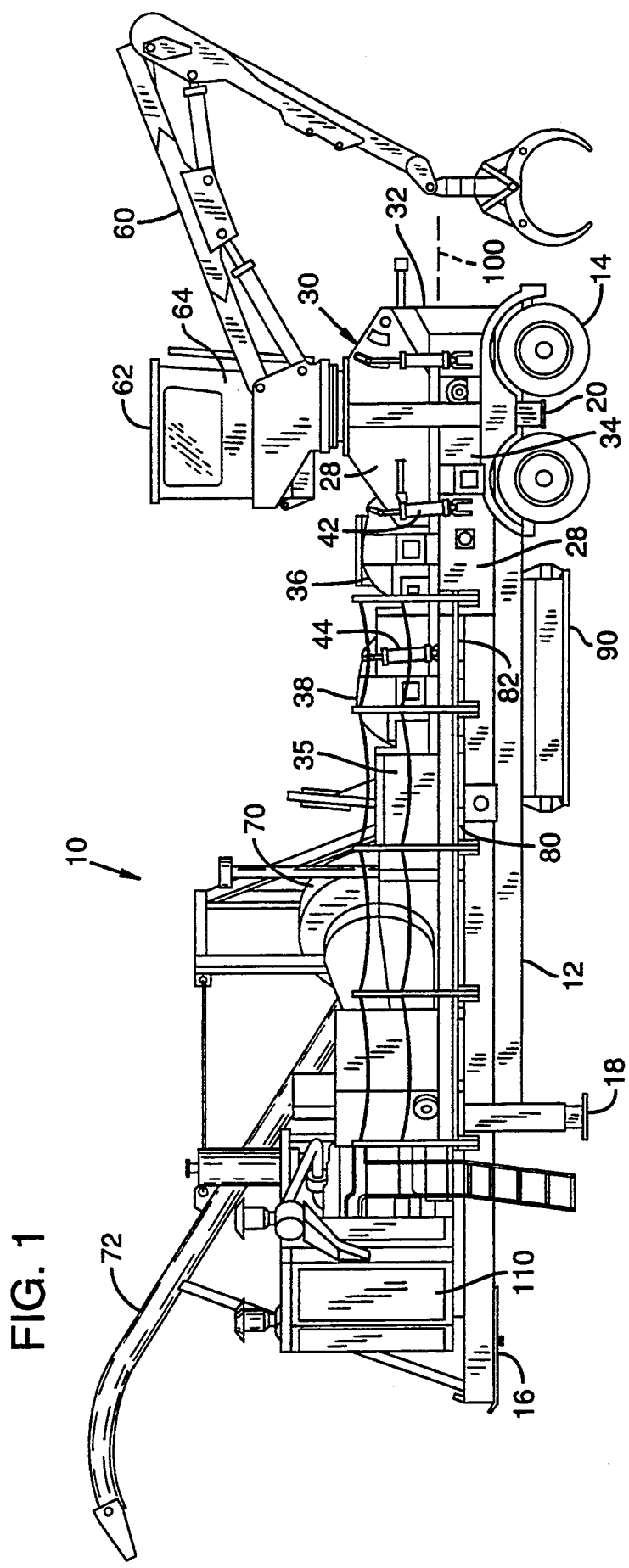
FIG. 1 is a side view of a combination debarking/delimbing and chipping machine of the present invention.

Refer now To FIG. 1 of the drawings which illustrates a combination debarking/delimbing and chipping machine 10. The machine 10 is a mobile unit having its components mounted on a configured chassis 12. Wheels 14 are provided near one end of the chassis for transport and a hitch 16 is provided at the opposite end of the chassis for coupling the machine 10 to a conventional towing unit, such as a tractor (not shown). The chassis 12 has outriggers 18 near the hitch end of the chassis and outriggers 20 positioned near the wheels 14. The outriggers 18 support the hitch end of the machine 10 when uncoupled from the towing unit and are adjusted in conjunction with the outriggers 20 to level and stabilize the machine 10. A debarking/delimbing unit 30, hereafter referred to as a debarker 30 is mounted on the chassis 12 near the wheeled end. A housing 28 of the debarker 30 extends upward from the chassis 12 and supports a loader 60 which is mounted over the debarker 30. A chipping unit 70, hereafter referred to as a chipper 70 is mounted on the chassis 12 at a distance from the debarker 30. A conveyor system 80 is provided on the chassis 12, the conveyor system 80 being integrated with the debarker 30 and the chipper 70. A bark chute 90 is provided on the chassis 12 and is position below the conveyor system 80. The machine 10 has a longitudinal feed path 100 that extends substantially along the longitudinal length of the chassis 12. The machine 10 has a power unit, indicated generally by the numeral 110, which supplies power to drive the components of the machine 10.

Basically a log, or multiple logs referred to as bundle are fed into the entry 32 of the debarker 30 by the loader 60. The logs travel along the feed path 100 through the debarker 30 where bark, limbs and other debris are loosened and removed by upper and lower flails. The log (bundle) is supported and conveyed by the conveyor system 80. The loosened bark, limbs and other debris falls through spaces 82 provided in the conveyor system 80 into the bark chute 90 where it is discharged to one side of the machine 10. The log (bundle) exiting the debarker 30 through exit 35 is conveyed into the chipper 70 which reduces the log (bundle) to chips. The chips are discharged from the chipper 70 via the chute 72 into a receptacle such as a truck box (not shown).

Refer now to FIG. 2 of the drawings which illustrates schematically the debarker 30. The debarker 30 has a lower chain type flail 34 mounted transverse to and below the longitudinal feed path 100. The lower flail 34 is rotatably mounted in the housing 28 of the debarker 30. The chains of the lower flail 34 during operation of the debarker 30 preferably extend a sufficient distance into the feed path 100 to reach approximately to the center point of the largest log diameter that the debarker 30 will accommodate. The upper chain type flails, designated as 36, 38 are rotatably mounted above the feed path 100 on support structure, hereafter referred to as arms 40, and are counter balanced by cylinders 42, 44 (see FIG. 1) in a known manner, arm 40 of flail 36 being pivotally mounted to housing 28 at 37 and arm 40 of flail 38 being pivotally mounted to housing 28 at 39 with a gate 41 being connected to each arm 40. The flails 36, 38 are independently movable about their pivot points. The flails 36, 38 are driven by separate known drive systems. The rate of rotation and the direction of rotation of the flails 36, 38 are separately controllable.

Figure 3:
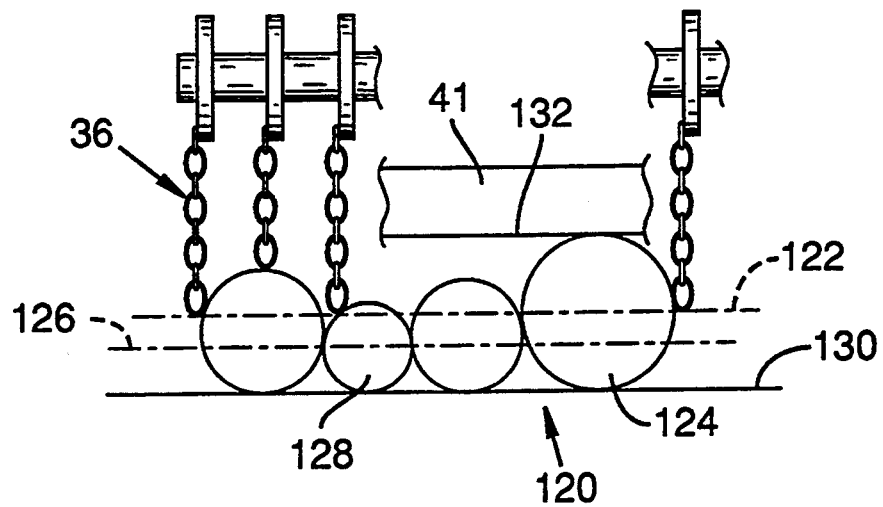
FIG. 3 is a schematic illustration showing a log bundle in relation to an upper flail of the debarking/delimbing unit of the machine of FIG. 1.

A log bundle 120 is shown entering the entry 32 of the debarker 30 and is progressing through the lower flail 34 in the direction as indicated by arrow 112. Only log 124 of the log bundle 120 is shown for clarity of the drawing. An end view of the log bundle 120 is illustrated in FIG. 3. As the log bundle 120 continues along the feed path 100, the log 124 will engage the gate 41 attached to flail 36 and will urge the gate 41 upward thus pivoting the upper flail 36 upward to adjust the position of the flail 36 to the size of the log 124. The log 124 as it progresses, urges the gate 41 upward and slides under the gate 41 with the gate riding on top of the log to maintain the flail 36 adjusted relative to the log 124. The gate 41 is preferably strategically positioned so that the ends of the chains of the flails 36 will approximately reach the midpoint of the log 124 as the log bundle 120 progresses through the upper flail 36. Similarly, as the log 124 engages gate 41 of upper flail 38, the upper flail 38 will be pivoted upward to adjust the position of the flail 38 to the size of the log 124.

The provision of two upper flails 36, 38 has distinct advantages over machines having a single upper flail. Consider for example the illustration of FIG. 3. An end view of a log bundle 120 is shown in relation to the upper flail 36. The log bundle 120 is composed of multiple logs, the diameter of each log varying from another. It will be appreciated that the composition of log bundles will vary from bundle to bundle and the log bundle 120 is shown as an example.

The log bundle 120 is shown in a position where the largest log 124 has contacted and is sliding under the gate 41 (represented by line 132) of the upper flail 36. The log bundle 120 is supported and conveyed by the conveyor system 80 (represented by line 130). The log 124 has forced the gate 41 (132) upward thus moving the flail 36 upward thus adjusting the position of the flail 36 to the size of the log 124. Whereas the top half of the logs are fully exposed to the upper flails, the smaller logs can be somewhat protected by the larger logs and may not receive the desired impact of the flails to completely clean the logs. Of course, the logs of the bundle 120 do not travel through the debarker 30 in a static fixed relation. The logs are being bounced laterally shoved back and forth by the feed rollers and of course are being impacted at the various positions by the flails (upper and lower). In the instant shown in FIG. 3 however, it is possible that the small diameter log 128 will not be impacted sufficiently by the chains of the upper flail 36 to loosen and remove all of the bark on the top half of the logs. Any portion of the bark not loosened and removed by the first upper flail 36 will likely be removed by the second upper flail 38 as the log bundle 120 progresses through upper flail 38 of the debarker 30.

In addition to removing bark missed by the first upper flail 36, the second upper flail 38 aids in discharging loosened bark to be expelled downward through the openings in the conveyor system 80 into the bark chute 90. As previously mentioned, the rotational direction of the upper flail 38 is reversible. Referring to FIG. 4, flails 34 and 36 are preferably rotated as indicated by arrows 45, 47 so as to contact the logs in a direction that urges the logs along feed direction 112. The flail 38 can, however, be driven in the reverse direction, i.e., counter to feed direction 112, and as indicated by the directional arrow 31 will in addition to loosening and removing any remaining bark on the logs of the log bundle 120 will propel bark that is on top of the bundle rearwardly toward the upper flail 36. As the flail 38 impacts the loosened bark, the bark pieces will be reduced in size. This coupled with the agitation of the logs will cause the loosened bark to fall downward through the openings 82 in the conveyor as indicated by the arrows 83.

It has been found that the provision of the second upper flail 38 permits a reduction in the rotational speed of the flails without sacrificing quality or production. This speed reduction greatly increases the life of the flail chains. The log bundles may thus be also fed through the debarker 30 at higher feed rates to facilitate producing wood chips of a larger dimensions.

Figure 5:
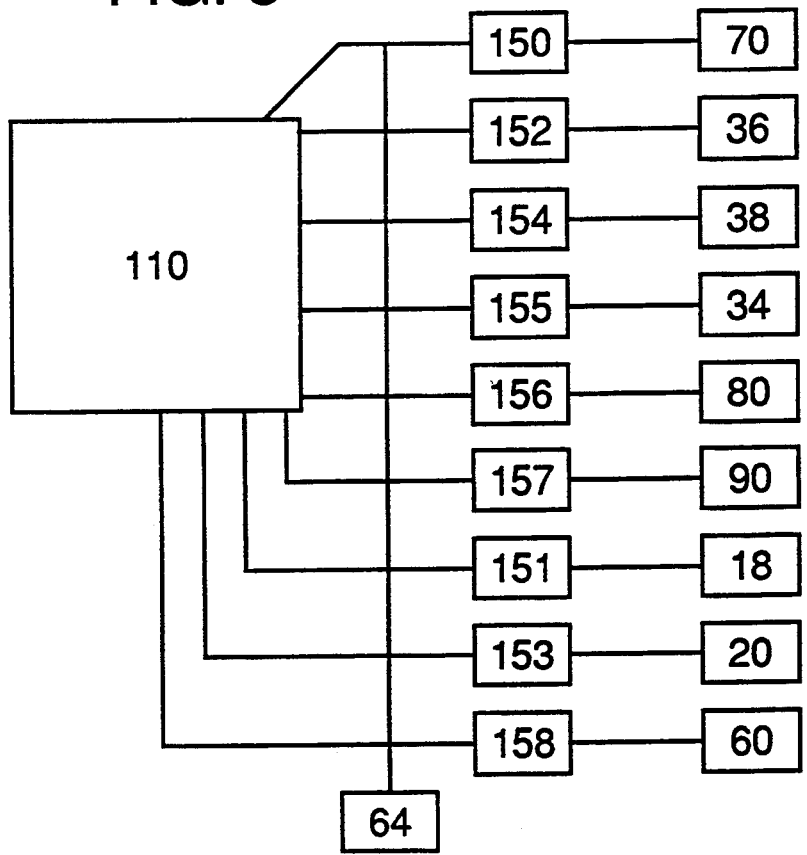
FIG. 5 is a block diagram illustrating a power unit, motors and controls of the combination machine of FIG. 1.

Refer now to FIG. 5 of the drawings. The components of the machine 10 are powered by the power unit 110. The power unit is of known design having an engine, preferably a diesel engine to provide motive power and includes the necessary pumps, fluid storage tanks and other ancillary equipment. The apparatus coupled to the power unit 110 and utilized to power individual components to of the machine 10 are well known in the art and will not be detailed. The apparatus used to provide the driving force to a component will hereafter be simply referred to as a transmission or motor. A transmission 150 is coupled to the power unit 110 to provide power to the chipper 70. A motor 152 provides power to the upper flail 36, a motor 154 provides power to the upper flail 38, a motor 155 provides power to the lower flail 34, a motor 156 provides power to the conveyor system 80, a motor 157 provides power to the chip chute 90, a motor 151 provides power to the outriggers 18, a motor 153 provides power to the outriggers 20 and a motor 158 provides power to the loader 60. It will be appreciated that a motor may be inclusive of more than one "motor". The conveyor system 80 for example may have individual motors driving the infeed rollers of the debarker 30 and the infeed rollers of the chipper 70 in addition to other motors driving the other rollers of the conveyor system 80. The loader 60 includes an operator's cab 62 (see FIG. 1) with a control station 64 (out of view) being provided in the cab 62. The control station 64 has suitable controls to control all of the transmissions and motors of the machine 10. The operator may for example control the rotational speed of the motor 154, the rotational direction of the motor 154, and thus control the rate of rotation and the direction of rotation of the upper flail 38.

An advantage of the structure which may not be appreciated is that the unit of FIG. 1 may be sold without the upper flail 218 (as well as the motors, etc. that serve the upper flail). The unit would, however, be equipped to receive the upper flail 38 at any time during the life of the unit. Thus, a unit without flail 38 may be purchased for use in a forest area where the two flails 34, 36 adequately remove the bark. Then should the unit be moved, or should the requirements of bark removal be tightened, the owner could purchase a kit consisting of the upper flail 38 and the various components that serve the upper flail 38. It would thus be simply mounted in place to obtain the extra benefit.

It will be apparent to those skilled in the art that modifications and variations may be made without departing from the true spirit and scope of the invention. The invention is therefore not to limited to the embodiments described and illustrated Dut is to be determined from the appended claims.

I claim:

1. A mobile combination debarking/chipping machine comprising:
   a single chassis mounted on wheels supporting the chassis in elevated relation on a surface, and adapted to be transported between logging sites, said chassis being elongated with opposed ends and opposed sides and adapted to carry a sequence of machinery between its ends;
   a chipping unit mounted on the chassis near one end, a debarking unit mounted on the chassis near the other end and a conveyor system provided on the chassis for conveying a bundle of logs along a forwardly directed feed path into and through the debarking unit where the logs are debarked, said feed path then crossing a spacing whereat loose bark is removed from the logs and then into the chipping unit where the debarked logs are reduced to chips, said debarking unit comprising;
   a single rotatable bottom flailing member positioned below the feed path with rotating flails on the member being projected into the feed path to remove bark from the bottom half of the logs;
   a first rotatable upper flailing member positioned above the feed path, said first upper flailing member having flails projecting into the feed path, said first upper flailing member and said bottom flailing member cooperatively removing a major portion of the bark provided on said logs; and
   a second rotatable upper flailing member positioned above the feed path, said second upper flailing member having flails projected into the feed path, said second upper flailing member positioned forward of the first upper flailing member for removing attached and loose bark on the upper half of the logs not removed by the first upper flailing member.

2. A mobile combination debarking/chipping machine as defined in claim 1 wherein a bark chute is carried by the chassis and extended under the flails to receive bark that is removed from the logs by the flails.

3. A mobile combination debarking/chipping machine as defined in claim 1 wherein the second upper flailing member is rotatably driven independent of the first upper and lower flailing members.

4. A mobile combination debarking/chipping machine as defined in claim 1 wherein a drive control provides variable speed control of the flailing members for obtaining optimum flailing action of the flailing members.

5. A mobile combination debarking/chipping machine as defined in claim 1, wherein:
   said first rotatable upper flailing member is adjustably mounted to adapt to logs of differing diameters.

6. A mobile combination debarking/chipping machine as defined in claim 1, wherein:
   said second rotatable upper flailing member is adjustably mounted to adapt to logs of differing diameters.

7. A mobile combination debarking/chipping machine as defined in claim 1, wherein:
   said first rotatable upper flailing member and said bottom flailing member are positioned in overlying relationship.

8. A mobile combination debarking/chipping machine comprising:
- a single chassis mounted on wheels supporting the chassis in elevated relation on a surface, and adapted to be transported between logging sites, said chassis being elongated with opposed ends and opposed sides and adapted to carry a sequence of machinery between its ends;
- a chipping unit mounted on the chassis near one end, a debarking unit mounted on the chassis near the other end and a conveyor system provided on the chassis for conveying a bundle of logs along a forwardly directed feed path into and through the debarking unit where the logs are debarked, said feed path then crossing a spacing whereat loose bark is removed from the logs and then into the chipping unit where the debarked logs are reduced to chips, said debarking unit comprising;
- a rotatable bottom flailing member positioned below the feed path with rotating flails on the member being projected into the feed path to remove bark from the bottom half of the logs;
- a first rotatable upper flailing member positioned above the feed path, said first upper flailing member having flails projecting into the feed path, said first upper flailing member and said bottom flailing member cooperatively removing a major portion of the bark provided on said logs;
- a second rotatable upper flailing member position above the feed path, said second upper flailing member having flails projected into the feed path, said second upper flailing member positioned forward of the first upper flailing member for removing attached and loose bark on the upper half of the logs not removed by the first upper flailing member; and
- controls for controlling the rotative direction of the flailing members, said first upper flailing member and said lower flailing member rotated in a direction to urge the logs in a forward direction and said second upper flailing member rotated in a direction opposite to the first upper flailing member to direct bark removed from the log rearwardly and away from said chipping unit.

* * * * *